United States Patent Office 3,288,769
Patented Nov. 29, 1966

3,288,769
POLYMERIZATION CATALYSTS AND THEIR USE
Wilfrid Cooper, Aldridge, and George Vaughan, Sutton Coldfield, England, assignors to Dunlop Rubber Company Limited, London, England, a British company
No Drawing. Filed Feb. 26, 1963, Ser. No. 261,227
Claims priority, application Great Britain, Mar. 2, 1962, 8,120/62
24 Claims. (Cl. 260—88.2)

This invention relates to polymerization catalysts and to a method of polymerization employing such catalysts.

The use of catalysts formed from a polyvalent metal halide and an organo-metallic compound for the polymerization of unsaturated monomers is known, but in many cases, the efficiency of these catalysts is low, necessitating long reaction times. It would be an advantage if the efficiency could be considerably increased.

According to the present invention, a method for the preparation of a polymerization catalyst component comprises reacting under substantially anhydrous conditions a higher halide of a metal of the "A" sub-groups of Groups IV to VII or Group VIII of the Periodic Table of Mendeleeff, with a reducing agent comprising a metal of Groups I to III of the Periodic Table or a hydride or an organo-metallic compound of said metal to reduce said higher halide to a lower halide, mixing the said lower halide with a further higher halide of a metal different from the first-mentioned metal, but selected from the same groups of the Periodic Table, and reacting said further higher halide with said reducing agent to reduce it to a lower halide.

The invention also includes a polymerization catalyst component when prepared by the method described in the immediately-preceding paragraph.

The polymerization catalyst component prepared according to the method of the present invention is particularly useful for effecting the polymerization of unsaturated monomers and when the catalyst component is to be used in this manner, it is generally mixed with a further catalyst component to form the active polymerization catalyst. The further catalyst component may comprise an organic compound of a metal of Groups I to III of the Periodic Table, a metal hydride, an organo-metallic hydride or an organo-metallic halogen compound. Typical further catalyst components are the alkyl metal compounds of Group III metals, preferably aluminium, in which the alkyl groups contain 2 to 8 carbon atoms. Examples of the alkyl metal compounds are aluminium triethyl, aluminium tri-n-propyl, aluminium triisopropyl, aluminium tri-n-butyl, aluminium, triiso-butyl, and aluminium trioctyl. Dialkyl aluminium compounds can also be used and examples of these are dialkyl aluminium halides, particularly the chlorides such as diethyl aluminium chloride.

The invention also includes a method of polymerizing unsaturated monomers in which one or more unsaturated monomers are polymerized in the presence of a polymerization catalyst formed by mixing the polymerization catalyst component prepared according to the method of the invention and a further catalyst component referred to hereinbefore. Preferably the polymerization is also carried out in the presence of diisopropyl ether.

The polymerization catalyst component is prepared, as already stated, by reducing a higher halide of the appropriate metal with a reducing agent, and then a further higher halide of a different metal is mixed with the lower halide so obtained, and it is also reduced to a lower halide by reaction of the reducing agent. The term "higher halide," when used in this specification, is defined as a halide of a metal in its highest valency state and the term "lower halide" is hereby defined as a halide of a metal in a valency state lower than this maximum valency state. The preferred higher halides are the halides of titanium, zirconium, vanadium, tantalum, tungsten, manganese, iron, cobalt, and nickel, while chlorine is the preferred halogen. Examples of these compounds are titanium tetrachloride, zirconium tetrachloride, tungsten hexachloride, and vanadium tetrachloride.

The reducing agent which is used to reduce the valency state of the higher halide can comprise a metal, for example lithium, sodium, magnesium, aluminium, beryllium, or calcium, or can be a hydride or an organo-metallic compound of such a metal. Typical organo-metallic compounds are those which have already been mentioned for use as the further catalyst component, for example the alkyl metal compounds of Group III metals and, in fact, it is preferred to use such compounds since they not only bring about the reduction of the higher halide to a lower halide, but also form part of the catalyst system. Other reducing agents are the zinc dialkyl compounds such as zinc diethyl, lithium butyl, lead tetraethyl, Grignard reagents and tin alkyls.

The reaction between the reducing agent and the higher halides can be effected by adding a sufficient quantity of the reducing agent to reduce the first higher halide to its lower halide and then adding a further amount of reducing agent to reduce the further higher halide to a lower halide. Alternatively, a sufficient amount of the reducing agent can be employed in first instance to effect the reduction of both the halides without the need of adding a further amount of the reducing agent during the reaction. If desired, an excess of the reducing agent can be employed, if this is to be the further catalyst component. However, whether or not one of the two latter methods is to be used depends on the conditions of the reduction, for instance on the reactivity of the reducing agent, and the conditions should be such that reduction of either or both the higher halide and the further higher halide does not proceed beyond the desired stage.

The reaction between the higher halide and the reducing agent is preferably carried out in an inert liquid diluent such as a saturated aliphatic hydrocarbon or an aromatic hydrocarbon, e.g. liquid paraffin, decane, decalin, or benzene. The diluent is preferably an aliphatic hydrocarbon. The reaction should also be carried out in the absence of water and, if desired, can be carried out at an elevated temperature. When an aluminium compound is used as the reducing agent then the reduction proceeds at room temperature but when a zinc compound or a mercury compound is used then it is desirable that the reduction reaction should be carried out at an elevated temperature, say up to 125° C.

The method of preparation of polymerization catalyst components according to the present invention is particularly useful for the preparation of a catalyst component based on alpha-titanium trichloride. In this method, titanium tetrachloride dissolved in dry liquid paraffin is treated at room temperature with a reducing agent, for example aluminium triethyl in liquid paraffin and reduced to titanium trichloride. The reaction mixture is then heated at a temperature between 135° C. and 225° C. to convert the titanium trichloride into the alpha form. The further higher halide, preferably vanadium tetrachloride, is then added to the cooled reaction mixture and then is added a further amount of aluminium triethyl to bring about the reduction of the vanadium tetrachloride to vanadium trichloride. Preferably, the molecular ratio of titanium:vanadium in the catalyst component should be within the range 1:4 to 4:1. The catalyst prepared in this way is wholly or substantially insoluble in hydrocarbon solvents such as petrol and benzene.

As already indicated, the polymerization catalyst component, when mixed with a further catalyst component, is an extremely effective catalyst for the polymerization of unsaturated monomers, for example, olefines such as ethylene and propylene, and dienes such as butadiene and isoprene. Copolymers of one or more olefines can be produced and the catalyst is of particular use in the polymerization of isoprene, especially using a catalyst based on titanium trichloride and vanadium trichloride. It has been found that the polymerization catalyst, when prepared according to the method of the present invention, effects the polymerization of isoprene at a rate which is from 30 to 60 times faster than when a catalyst based solely on vanadium trichloride and aluminium triethyl, is used at high catalyst concentrations. At low concentrations of catalyst (0.1 to 0.25 percent of vanadium trichloride based on the weight of monomer) which are preferred, the greater efficiencies become more marked when compared with catalysts based solely on titanium trichloride or vanadium trichloride and aluminium alkyl which do not give any appreciable amounts of polymer. Comparing the yields of polymer obtained per unit weight of lower halide per hour the catalyst based solely on titanium trichloride or vanadium trichloride and aluminium alkyl give efficiencies of polymer conversion of 0.0004 and 0.0002 respectively when compared with catalysts of the present invention, i.e. the present catalysts, are several thousand times as efficient as the separate catalysts.

The efficiencies of the catalyst prepared by the method of the present invention have been compared with other known catalysts in a manner different to that described in the immediately-preceding paragraph. The number of active titanium and vanadium atoms in a catalyst containing titanium trichloride and vanadium trichloride in a molar ratio of 2:1, have been measured and it has been found that one in six of the total titanium and vanadium atoms are active for the purpose of polymerization. In a known catalyst consisting of aluminium triethyl and vanadium trichloride in a molar ratio of 2:1, one in nine-hundred of the vanadium atoms are active for the purpose of polymerization. Clearly, the catalyst prepared by the method of the present invention is a more efficient polymerization catalyst.

The method of preparing a polymerization catalyst component according to the present invention, enables polymerization reactions to be carried out at a much increased rate, ensuring that an increase in production and an increase in the productive capacity of any reactor, is obtained.

The invention is illustrated in the following examples:

Example I

This example illustrates the preparation of a catalyst component and of the use of a catalyst component when mixed with a further catalyst component to catalyze the polymerization of isoprene.

Titanium tetrachloride (3.8 gm.) was dispersed in dry liquid paraffin (150 ml.) and treated at room temperature for 30 minutes with aluminium triethyl (1.10 ml.) dispersed in liquid paraffin (50 ml.). The molecular ratio of aluminium:titanium was 0.4:1. The temperature of the brown mixture so obtained was slowly raised to 170° C. during 1 hour and the mixture than heated for a further hour until the colour changed to violet. This corresponded to the alpha form of titanium trichloride. The mixture was cooled and vanadium tetrachloride (1.9 gm.) was then added, followed by aluminium triethyl (0.50 ml.) dispersed in liquid paraffin as before. The molecular ratio of vanadium-titanium was 0.5:1. The mixture was then heated for 1 hour at 120° C. to 135° C. to reduce the vanadium tetrachloride to vanadium trichloride. The product had a deep-purple red colour and the liquid paraffin was removed by washing with benzene.

A mixture of petrol, boiling point 90° C. to 105° C. (1000 ml.), aluminium triethyl (21.1 ml.), diisopropyl ether (0.75 ml.), and isoprene (250 ml.) was stirred in an oxygen-free atmosphere in a polymerization vessel. To this mixture was added sufficient of the catalyst component containing titanium trichloride and vanadium trichloride to correspond with 0.12 percent of vanadium trichloride on the amount of isoprene.

Polymerization of the isoprene commenced immediately on adding this catalyst component, and proceeded at room temperature to give a highly-viscous reaction mixture within 5 to 10 minutes. After 1 hour, the yield of polyisoprene was 80 percent.

A control experiment using 0.25 percent of vanadium trichloride in the absence of titanium trichloride carried out under identical conditions, gave no polymer within this time. The polyisoprene obtained using the mixed catalyst component containing titanium trichloride and vanadium trichloride was a tough, high molecular weight substance which crystallized on standing at room temperature. Obviously, the use of the mixed catalyst component increased the efficiency of the catalyst by a large amount.

The preparation of a mixed catalyst component was repeated employing a molecular ratio of vanadium:titanium of 1:1 and a molecular ratio of aluminium:vanadium in the polymerization of 10. A 25 percent conversion of monomer to polymer was achieved within 1 hour and the polyisoprene obtained crystallized from the melt as rapidly as gutta-percha and showed melting transitions of 50° C. and 62° C.

Example II

A number of experiments on the polymerization of isoprene using catalyst components prepared by a method similar to that described in Example I were carried out. Aluminium triethyl was used as the further catalyst component.

Details of the polymerization are given in the following three tables:

TABLE I

| Experiment No. | Solvent | Solvent: Monomer | Vanadium/ Titanium | Aluminium/ Vanadium |
| --- | --- | --- | --- | --- |
| 1 | Benzene | 4 | 1.0 | 5 |
| 2 | Petrol | 4 | 1.0 | 5 |
| 3 | do | 4 | 0.5 | 10 |
| 4 | Benzene | 4 | 0.25 | 5 |
| 5 | Petrol | 4 | 1.0 | 10 |
| 6 | do | 10 | 1.0 | 10 |
| 7 | do | 4 | 1.0 | 10 |
| 8 | do | 10 | 1.0 | 10 |
| 9 | do | 4 | (¹) | 10 |
| 10 | do | 4 | (¹) | 10 |
| 11 | do | 4 | (¹) | 10 |
| 12 | do | 4 | 0 | ² 5 |

¹ Infinity.  ² (Al/Ti).

TABLE II

| Experiment No. | Percentage weight based on monomer of— | | |
| --- | --- | --- | --- |
| | VCl₃ | Total Catalyst | Diisopropyl ether |
| 1 | 0.25 | 1.58 | 0.5 |
| 2 | 0.188 | 1.572 | 0.5 |
| 3 | 0.25 | 3.12 | 0.25 |
| 4 | 0.25 | 2.16 | None |
| 5 | 0.25 | 2.63 | 0.5 |
| 6 | 0.25 | 2.63 | 0.5 |
| 7 | 0.25 | 3.1 | 0.07 |
| 8 | 0.25 | 3.1 | 0.07 |
| 9 | 0.25 | 2.4 | 0.5 |
| 10 | 0.5 | 4.7 | 0.5 |
| 11 | 1.0 | 9.3 | 0.5 |
| 12 | ¹ 0.5 | 1.53 | None |

¹ (TiCl₃)

TABLE III

| Experiment No. | Reaction time (hrs.) | Conversion (percent) | Efficiency |
| --- | --- | --- | --- |
| 1 | 1¼ | 23.0 | 74 |
| 2 | 1 | 9.0 | 48 |
| 3 | 1 | 36.0 | 144 |
| 4 | 18½ | 45.0 | 10 |
| 5 | 2 | 36.0 | 72 |
| 6 | 3½ | 56.0 | 64 |
| 7 | 2 | 80.0 | 160 |
| 8 | 3½ | 83.0 | 95 |
| 9 | 5½ | 2.5 | 1.8 |
| 10 | 4¼ | 5.5 | 2.6 |
| 11 | 18 | 19.0 | 1.1 |
| 12 | 19½ | (1) | 0 |

[1] No polymer.

The efficiency is expressed as grams of polymer per gram of vanadium trichloride per hour.

Table II shows the efficiency of the polymerization systems employing the combined catalyst components as illustrated in Experiments 1 to 8. In Experiments 9, 10 and 11, the polymerization catalyst was based solely on a mixture of vanadium trichloride and aluminium triethyl, and Table III illustrates that similar yields of polymer are obtained.

Experiment 12 was carried out using a polymerization catalyst based solely on titanium trichloride and aluminium triethyl. As can be seen, no polymer was obtained at the end of the reaction time.

*Example III*

The apparatus consisted of a flanged glass flask fitted with a stirrer, in inlet dip tube which was just long enough to dip into the solvent, and an outlet tube. This was attached to a gas wash bottle containing liquid paraffin. The inlet tube was connected via an empty wash bottle, an alumina drying tower, and a rotameter to the ethylene cylinder. The apparatus had been previously dried in an oven and then cooled under dry nitrogen.

Petrol (300 ml.) was placed in the glass flask and saturated with ethylene, saturation point was observed by maintaining the gas flow at such a rate that bubbling just took place in the outlet wash botttle. Catalyst (aluminium triethyl (0.45 ml.) and $TiCl_3/VCl_3=1/1$ (0.04 gm.) suspended in petrol), was added and the reaction allowed to proceed. Ethylene was added at a sufficient rate to keep the solution saturated. The reaction vessel became warm (35° C. to 40° C.) and polymer was precipitated (5 mins.). After about 1 hour the temperature began to decrease as did the pink colour of the solution. The reaction was stopped by adding a few cubic centimetres of ethanol and the polymer was collected on a filter. Yield 12.5 g. This corresponds to a yield of 310 gm. of polyethylene per gm. of metal sub-halides.

*Example IV*

This example illustrates the preparation of a catalyst component using zinc diethyl as the reducing agent.

To a stirred solution of liquid paraffin (200 ml.) containing titanium tetrachloride (3.79 gm.; 0.02 mole) at room temperature, was added zinc diethyl (1.24 gm.; 0.01 mole) dissolved in liquid paraffin (25 ml.). After the addition of the zinc diethyl (ca. 5 to 10 minutes), the reaction mixture was stirred for a further 1½ hours. The temperature was raised to 120° C. to 130° C. and the reaction continued at this temperature for 0.75 hour. The resulting brown solution (beta-titanium trichloride) was then heated to 210° C. at which temperature the violet alpha form of titanium trichloride crystallized.

The above solution of violet titanium trichloride was cooled to room temperature and vanadium tetrachloride (3.89 gm.; 0.02 mole) was added followed by the addition of zinc diethyl (1.24 gm.; 0.01 mole) dissolved in liquid paraffin (25 ml.). The mixture was stirred at room temperature for an hour and then heated at 120° C. to 140° C. for a further 0.2 to 0.75 hour. The catalyst so obtained (titanium trichloride/vanadium trichloride) was centrifuged and washed several times with heptane. It was subsequently used for the polymerization of isoprene to give a high trans-polyisoprene polymer using aluminium triethyl as the further catalyst component. In petrol (solvent/monomer=4), vanadium trichloride=2.5 percent and aluminium/vanadium=5, 12 percent of crystalline polymer was obtained in 1 hour.

*Example V*

This example illustrates the copolymerization of ethylene and propylene employing a catalyst component prepared by the method as described in Example I.

Petrol (250 ml.) was saturated with a 3:1 mixture of propylene and ethylene. Aluminium triisobutyl (0.0025 mole) was added followed by a 1:1 titanium trichloride/vanadium trichloride suspension in petrol (0.0025 mole). The solution was stirred for 1 hour at room temperature and atmospheric pressure. The solution was kept saturated with a gas mixture at a flow rate about 6 litres per hour of propylene containing 20 percent propane and 1.5 litres per hour of ethylene. During the polymerization the solution became slightly warm. After 1 hour the reaction was stopped by adding excess ethanol to destroy the catalyst and precipitate the copolymer of ethylene and propylene in a yield of 3 gm.

*Example VI*

This example illustrates the preparation of a copolymer of ethylene, propylene and bicyclopentadiene. The experiment described in Example V was repeated using similar amounts of monomer, solvent and catalyst.

However, after the addition of the catalyst component a solution of bicyclopentadiene (0.3 gm.) in petrol (100 ml.) was added dropwise over 2 hours. This represents 5 percent on the yield of 6 gm. of polymer. After 2 hours, the solution was treated in the usual manner, except for the addition of a small amount of phenyl-beta-naphthylamine added to the alcohol used for washing the polymer. The polymer was dried in a vacuum oven.

*Example VII*

This example illustrates the polymerization of butadiene using a catalyst component obtained by the method described in Example I and aluminium triethyl as the further catalyst component. In all, six experiments were carried out using different catalyst ratios and aluminium:vanadium ratios. These are summarized in the following table:

TABLE

| Experiment No. | Catalyst | Al:V ratio | (Petrol) Solvent: Monomer | Time (hrs.) | Temp. (° C.) | Conversion (Percent) |
| --- | --- | --- | --- | --- | --- | --- |
| 20 | TiCl₃/VCl₃ Ratio 1:1 | 20:1 | 4:1 | 17½ | 50 | 90 |
| 21 | | | | | | 96 |
| 22 | TiCl₃/VCl₃ Ratio 1:1 | 20:1 | 4:1 | 17½ | 50 | 88 |
| 23 | | | | | | 90 |
| 24 | TiCl₃/VCl₃ Ratio 1:2 | 13.3:1 | 4:1 | 1 | 50 | 30 |
| 25 | | | | | | |

In Experiments 22 and 23, the polymerization mixture contained diisopropyl ether in a small amount.

The table shows clearly that the butadiene was substantially polymerized at the end of the reaction period.

*Example VIII*

This example illustrates the polymerization of 1,3-pentadiene employing the combination catalyst component prepared in Example I.

Aluminium triethyl (0.24 gm.) and the combination catalyst component (0.2 gm.) as prepared in Example I as a slurry in heptane were added to 60 ml. of dry heptane. 10 gm. of piperylene were added and the reaction vessel flushed with nitrogen and sealed. An immediate increase in viscosity was noticed. The reaction vessel was rocked at 50° C. for 15 hours and the product was then dissolved in a large volume of heptane and the polymer precipitated with methanol. 3.5 gm. of 98 percent trans-poly-1,3-pentadiene were obtained. Initially the rate of conversion of the monomer to the polymer was high but polymerization ceased when the conversion reached 40 percent.

*Example IX*

This example illustrates the preparation of a copolymer of isoprene and butadiene.

Aluminium triethyl (0.24 gm.) as a dilute heptane solution was added to 60 ml. of dry heptane and 5 gm. of isoprene, and 5 gm. of butadiene were then added. 0.1 gm. of the combination catalyst component, as prepared in Example I as a slurry in heptane, was then added. The reaction vessel was rocked at 50° C. for 15 hours at the end of which time a 100 percent conversion of the monomer to polymer was obtained.

Having now described our invention, what we claim is:

1. A method for the preparation of a polymerization catalyst component which comprises reacting under substantially anhydrous conditions in the presence of an inert liquid diluent, a first higher halide of a metal selected from Group IV-A of the Mendeleeff Periodic Table, with a reducing agent selected from the class consisting of metals of Groups I to III of the Mendeleeff Periodic Table, hydrides of said metals and organo-metallic compounds of said metals to reduce said higher halide to a lower halide, mixing said lower halide with a further higher halide of a metal selected from Group V-A of the Mendeleeff Periodic Table, and reacting said further higher halide with said reducing agent to reduce it to a lower halide.

2. A method according to claim 1 wherein the amount of the reducing agent mixed with the first higher halide is sufficient to reduce the first higher halide and the further higher halide to their respective lower halides.

3. A method according to claim 1 wherein the amount of the reducing agent mixed with the first higher halide is sufficient to reduce the halide to its lower halide and further comprising adding a further amount of the reducing agent to effect reduction of the further higher halide.

4. A method according to claim 1 wherein the catalyst component, after preparation, is mixed with a further catalyst component selected from the class consisting of organic compounds of the metals of Groups I to III of the Mendeleeff Periodic Table, metal hydrides, organo-metallic hydrides, and organo-metallic halogen compounds.

5. A method according to claim 4 wherein the first higher halide and the further higher halide are titanium tetrachloride and vanadium tetrachloride respectively.

6. A method according to claim 4 wherein the reducing agent and the further catalyst component are identical compounds.

7. A method according to claim 4 wherein the reducing agent and the further catalyst component are different compounds.

8. A method according to claim 1 wherein the reducing agent is an alkyl compound of a metal selected from Group III of the Mendeleeff Periodic Table.

9. A method according to claim 8 wherein the metal alkyl compound is an aluminium trialkyl in which the alkyl groups each contain 2 to 8 carbon atoms.

10. A method according to claim 8 wherein the alkyl metal compound is a dialkyl aluminium halide in which the alkyl groups each contain from 2 to 8 carbon atoms.

11. A method according to claim 10 wherein the dialkyl aluminium halide is diethyl aluminium chloride.

12. A method for the preparation of a polymerization catalyst component which comprises reacting titanium tetrachloride under substantially anhydrous conditions in the presence of an inert liquid diluent, with a reducing agent comprising an aluminium alkyl in an amount sufficient to reduce said titanium tetrachloride to titanium trichloride, heating the reaction mixture to a temperature of 135° C. to 225° C., mixing vanadium tetrachloride with the mixture, and adding a further amount of an aluminium alkyl sufficient to reduce the vanadium tetrachloride to vanadium trichloride.

13. A method according to claim 12 wherein the reducing agent is aluminium triethyl.

14. A method according to claim 12 wherein the molar ratio of titanium tetrachloride to vanadium tetrachloride is from 1:4 to 4:1.

15. A method according to claim 12 in which the inert liquid diluent is liquid paraffin.

16. A method for polymerizing at least one unsaturated monomer selected from the group consisting of monoolefins and diolefins which comprises preparing a polymerization catalyst component by reacting, under substantially anhydrous conditions in the presence of an inert liquid diluent, a higher halide of a metal selected from Group IV-A of the Mendeleeff Periodic Table, with a reducing agent selected from the class consisting of the metals of Groups I to III of the Mendeleeff Periodic Table, hydrides of said metals and organo-metallic compounds of said metals to reduce said higher halide to a lower halide, mixing said lower halide with a further higher halide of a metal selected from Group V-A of the Mendeleeff Periodic Table, and reacting said further higher halide with said reducing agent to reduce it to a lower halide, mixing a further catalyst component with the reaction mixture selected from the class consisting of organic compounds of the metals of Groups I to III of the Mendeleeff Periodic Table, metal hydrides, organo-metallic hydrides, and organo-metallic halogen compounds, and mixing at least one unsaturated polymerizable monomer with the catalyst so formed to effect polymerization of each monomer.

17. A method according to claim 16 wherein the unsaturated monomer is an alpha monoolefin.

18. A method according to claim 17 wherein a mixture of ethylene and propylene is polymerized.

19. A method according to claim 17 wherein at least one organic diene selected from the group consisting of butadiene and isoprene is polymerized.

20. A method according to claim 16 in which the inert liquid diluent is liquid paraffin.

21. A method according to claim 16 wherein diisopropyl ether is mixed with the polymerization reaction mixture.

22. A method for polymerizing at least one unsaturated monomer selected from the group consisting of monoolefins and diolefins which comprises reacting titanium tetrachloride under substantially anhydrous conditions in the presence of an inert liquid diluent, with an aluminium alkyl in an amount sufficient to reduce said titanium tetrachloride to titanium chloride, heating the reaction mixture to a temperature of 135° C. to 225° C., mixing vanadium tetrachloride with the mixture, and adding a further amount of an aluminium alkyl sufficient to reduce the vanadium tetrachloride to vanadium trichloride, mixing a further amount of aluminium alkyl with the reaction mixture to form a polymerization catalyst, and mixing at least one unsaturated monomer with said catalyst to effect polymerization of each monomer.

23. A method according to claim 22 wherein the aluminium alkyl is in each case aluminium triethyl.

24. A method according to claim 22 wherein the aluminium alkyl is in each case diethyl aluminium chloride.

References Cited by the Examiner
FOREIGN PATENTS 881,212 11/1961 Great Britain.
886,371 1/1962 Great Britain.

JOSEPH L. SCHOFER, *Primary Examiner.*

M. B. KURTZMAN, *Assistant Examiner.*